(12) United States Patent
Kruger et al.

(10) Patent No.: US 7,539,843 B2
(45) Date of Patent: May 26, 2009

(54) VIRTUAL MEMORY FRAGMENT AWARE CACHE

(75) Inventors: Warren F. Kruger, Sunnyvale, CA (US); Wade K. Smith, Sunnyvale, CA (US)

(73) Assignee: ATI Technologies, Inc. (CA)

( * ) Notice: Subject to any disclaimer, the term of this patent is extended or adjusted under 35 U.S.C. 154(b) by 399 days.

(21) Appl. No.: 11/549,570

(22) Filed: Oct. 13, 2006

(65) Prior Publication Data

US 2007/0073996 A1    Mar. 29, 2007

Related U.S. Application Data

(63) Continuation-in-part of application No. 11/102,210, filed on Apr. 7, 2005, now Pat. No. 7,447,869.

(51) Int. Cl.
G06F 12/10    (2006.01)
(52) U.S. Cl. ...................................... 711/207
(58) Field of Classification Search ............ None
See application file for complete search history.

(56) References Cited

U.S. PATENT DOCUMENTS

| 5,555,395 | A  | * | 9/1996 | Parks .................... 711/145 |
| 5,734,858 | A  | * | 3/1998 | Patrick et al. ............ 711/208 |
| 6,189,074 | B1 |   | 2/2001 | Pedneau |
| 6,370,632 | B1 |   | 4/2002 | Kikuta et al. |
| 6,381,682 | B2 |   | 4/2002 | Noel et al. |
| 6,446,186 | B1 |   | 9/2002 | Priem et al. |
| 6,560,688 | B1 |   | 5/2003 | Strongin et al. |
| 7,330,958 | B2 | * | 2/2008 | Davis ...................... 711/203 |
| 2002/0169936 | A1 |   | 11/2002 | Murphy |
| 2004/0215918 | A1 |   | 10/2004 | Jacobs et al. |
| 2007/0073996 | A1 | * | 3/2007 | Kruger et al. ............... 711/207 |
| 2007/0079106 | A1 | * | 4/2007 | Davis ...................... 711/203 |
| 2008/0052486 | A1 | * | 2/2008 | Davis ...................... 711/206 |

OTHER PUBLICATIONS

International Search Report and Written Opinion for International Application No. PCT/IB2006/000973, mailed on Oct. 19, 2006, 11 pages.

* cited by examiner

*Primary Examiner*—Kevin Verbrugge
(74) *Attorney, Agent, or Firm*—Sterne, Kessler, Goldstein & Fox P.L.L.C.

(57) ABSTRACT

The present invention is directed to a method, computer program product, and system for processing memory access requests. The method includes the following features. First, page table entries of a page table are organized into at least one fragment that maps logical memory to at least one of logical memory or physical memory. The at least one fragment has a fragment size and an alignment boundary. Then, a subset of the page table entries stored in one of a plurality of cache banks is accessed to determine a mapping between a first logical memory address and at least one of a second logical memory address or a physical memory address. Each cache bank is configured to store at least one page table entry corresponding to a fragment of a predetermined set of fragment sizes and a predetermined alignment boundary.

20 Claims, 8 Drawing Sheets

VIRTUAL MEMORY FRAGMENT AWARE CACHE

CROSS REFERENCE TO RELATED APPLICATIONS

This application is a continuation-in-part of U.S. patent application Ser. No. 11/102,210 to Kruger et al., entitled "Method and Apparatus for Fragment Processing in a Virtual Memory System" and filed Apr. 7, 2005, the entirety of which is incorporated by reference as if fully set forth herein.

BACKGROUND OF THE INVENTION

1. Field of the Invention

The present invention is generally directed to virtual memory systems in computer systems.

2. Background Art

The ever-increasing capability of computer systems drives a demand for increased memory size and speed. The physical size of memory cannot be unlimited, however, due to several constraints including cost and form factor. In order to achieve the best possible performance with a given amount of memory, systems and methods have been developed for managing available memory. One example of such a system or method is virtual addressing, which allows a computer program to behave as though the computer's memory was larger than the actual physical random access memory (RAM) available. Excess data is stored on hard disk and copied to RAM as required.

Virtual memory is usually much larger than physical memory, making it possible to run application programs for which the total code plus data size is greater than the amount of RAM available. This is known as "demand paged virtual memory". A page is copied from disk to RAM ("paged in") when an attempt is made to access it and it is not already present. This paging is performed automatically, typically by collaboration between the central processing unit (CPU), the memory management unit (MMU), and the operating system (OS) kernel. The application program is unaware of virtual memory; it just sees a large address space, only part of which corresponds to physical memory at any instant.

The virtual address space is divided into pages. Each virtual address output by the CPU is split into a (virtual) page number (the most significant bits) and an offset within the page (the N least significant bits). Each page thus contains $2^N$ bytes. The offset is left unchanged and the MMU maps the virtual page number to a physical page number. This is recombined with the offset to give a physical address that indicates a location in physical memory (RAM).

The performance of an application program depends dramatically on how its memory access pattern interacts with the paging scheme. If accesses exhibit a lot of locality of reference (i.e., each access tends to be close to previous accesses) the performance will be better than if accesses are randomly distributed over the program's address space, thus requiring more paging. In a multitasking system, physical memory may contain pages belonging to several programs. Without demand paging, an OS would need to allocate physical memory for the whole of every active program and its data, which would not be very efficient.

Current computer systems, even relatively small scale personal computer systems, include multiple subsystems and/or coprocessors working with the CPU and OS to perform specialized functions. For example, graphics coprocessors (or graphics processing units (GPUs)), floating point coprocessors, networking processors, and other types of coprocessors are used to process large amounts of data with as much speed as possible and include large amounts of memory. A consistent set of rules governs access to the physical memory for all of the system elements or subsystems requesting such access. For example, the OS may dictate a page size and page table format to which each subsystem must interface for virtual memory accesses.

A page table in a virtual memory system is an array that contains an entry for each current virtual-to-physical address translation. A page table entry (PTE) in the page table typically contains a physical page number and flag bits. Pages are of a uniform size and the smaller the page size, the less likely a reference to a particular page will result in a cache hit. Accessing the page table to perform a virtual memory to physical memory translation can be slow, and may result in latency in the performance of the application program.

To reduce such latencies, many virtual memory systems include a translation lookaside buffer (TLB) and a cache. In general, performance of a virtual memory / page table translation system is based on the hit rate in the TLB. A TLB is a table that lists the physical address page number associated with each virtual address page number. A TLB is typically used as a cache whose tags are based on virtual addresses. The virtual address is presented simultaneously to the TLB and to the cache so that cache access and the virtual-to-physical address translation can proceed in parallel (the translation is done "on the side"). If the requested address is not cached, the physical address is used to locate the data in memory that is outside of the cache. This is termed a cache "miss." If the address is cached, this is termed a cache "hit."

Some virtual memory systems include multi-level cache systems. A multi-level cache system can reduce latencies while achieving a relatively high cache hit rate. Such a multi-level cache system may, for example, include a level one (L1) cache and a level two (L2) cache. The L1 cache provides a small cache that may be checked quickly to determine whether there is a cache hit. Due to its small size, however, the L1 cache typically has a relatively low cache hit rate, but otherwise performs well when there is commonality of reference. In contrast, the L2 cache provides a large cache. Due to its large size, the L2 cache typically has a relatively high cache hit rate but may take a relatively long time to determine whether there is a cache hit. In response to an address request, the L1 cache is checked first for the requested address. If there is a cache miss in the L1 cache, the L2 cache is checked for the requested address. In this way, the L1 cache provides for reduced latency (by enabling fast cache access) and the L2 cache provides for a high cache hit rate (by enabling storage of many page table entries).

However, it is desirable for virtual memory systems accessing a physical memory to employ techniques that increase hit rates. Challenges encountered in the design of such virtual memory systems include the constraints imposed by the memory architecture to which the virtual memory system must interface, including a fixed page size and a dictated page table entry format. It is also desirable for such techniques to be implemented in a multi-level cache system.

BRIEF SUMMARY OF THE INVENTION

Embodiments of the present invention are directed to a virtual memory fragment aware cache. A fragment is a contiguous series of pages with equivalent attributes. By determining a mapping between virtual memory and physical memory based on such fragments, a cache in accordance with an embodiment of the present invention provides an increased cache hit rate.

In accordance with an embodiment of the present invention there is provided a method for processing memory access requests, includes the following features. First, page table entries of a page table are organized into at least one fragment that maps logical memory to at least one of logical memory or physical memory. The at least one fragment has a fragment size and an alignment boundary. Then, a subset of the page table entries stored in one of a plurality of cache banks is accessed to determine a mapping between a first logical memory address and at least one of a second logical memory address or a physical memory address. Each cache bank is configured to store at least one page table entry corresponding to a fragment selected from a predetermined set of fragment sizes and a predetermined alignment boundary.

In accordance with another embodiment of the present invention there is provided a processor configured to process memory access requests, wherein page table entries of a page table are organized into at least one fragment that maps logical memory to at least one of logical memory or physical memory. The at least one fragment has a fragment size and an alignment boundary. The processor includes a client interface, a translation lookaside buffer (TLB), a cache, and a memory controller. The client interface is configured to receive a request for memory access. The TLB is coupled to the client interface and configured to store a first subset of the page table entries. The cache is coupled to the TLB and configured to store a second subset of the page table entries. The cache includes a plurality of banks, wherein each bank is configured to store a page table entry selected from a set of predetermined fragment sizes and a predetermined alignment boundary. The memory controller is coupled to the client interface, the TLB, and the cache and configured to service the request for memory access from at least one of the TLB and the cache.

In accordance with a further embodiment of the present invention there is provided a computer readable medium containing instructions for generating a processor which when executed are adapted to create the processor. Page table entries of a page table are organized into at least one fragment that maps logical memory to at least one of logical memory or physical memory. The at least one fragment has a fragment size and an alignment boundary. The processor includes a client interface, a TLB, a cache, and a memory controller. The client interface is configured to receive a request for memory access. The TLB is coupled to the client interface and configured to store a first subset of the page table entries. The cache is coupled to the TLB and configured to store a second subset of the page table entries. The cache includes a plurality of banks, wherein each bank is configured to store a page table entry selected from a set of predetermined fragment sizes and a predetermined alignment boundary. The memory controller is coupled to the client interface, the TLB, and the cache and configured to service the request for memory access from at least one of the TLB and the cache.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

FIG. 3 depicts a diagram of a page table entry (PTE) in accordance with an embodiment of the present invention.

Figure 4A:
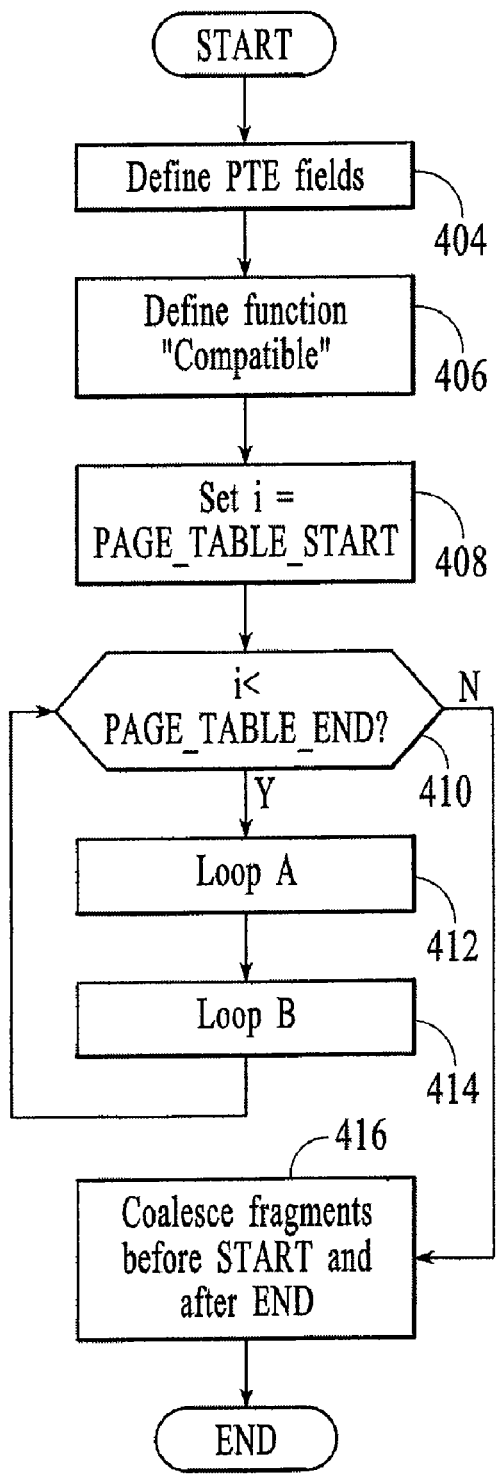
Figure 4B:
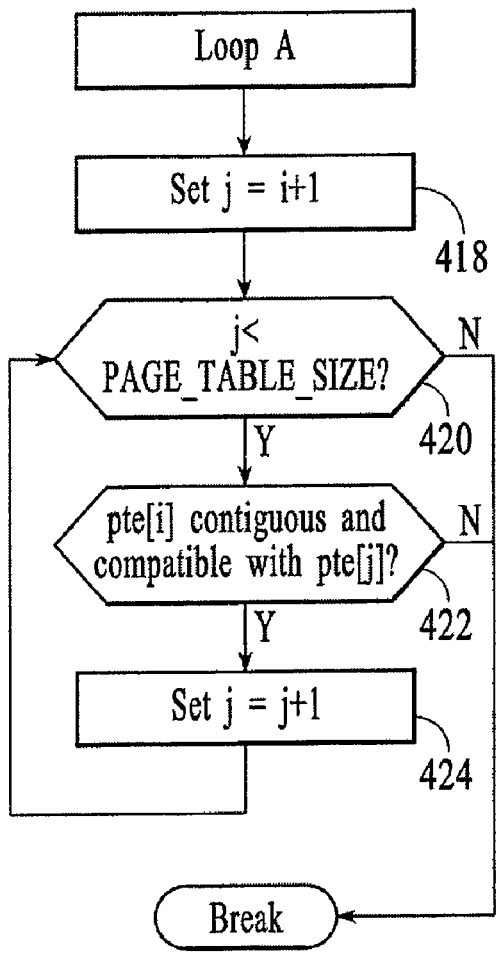
Figure 4C:
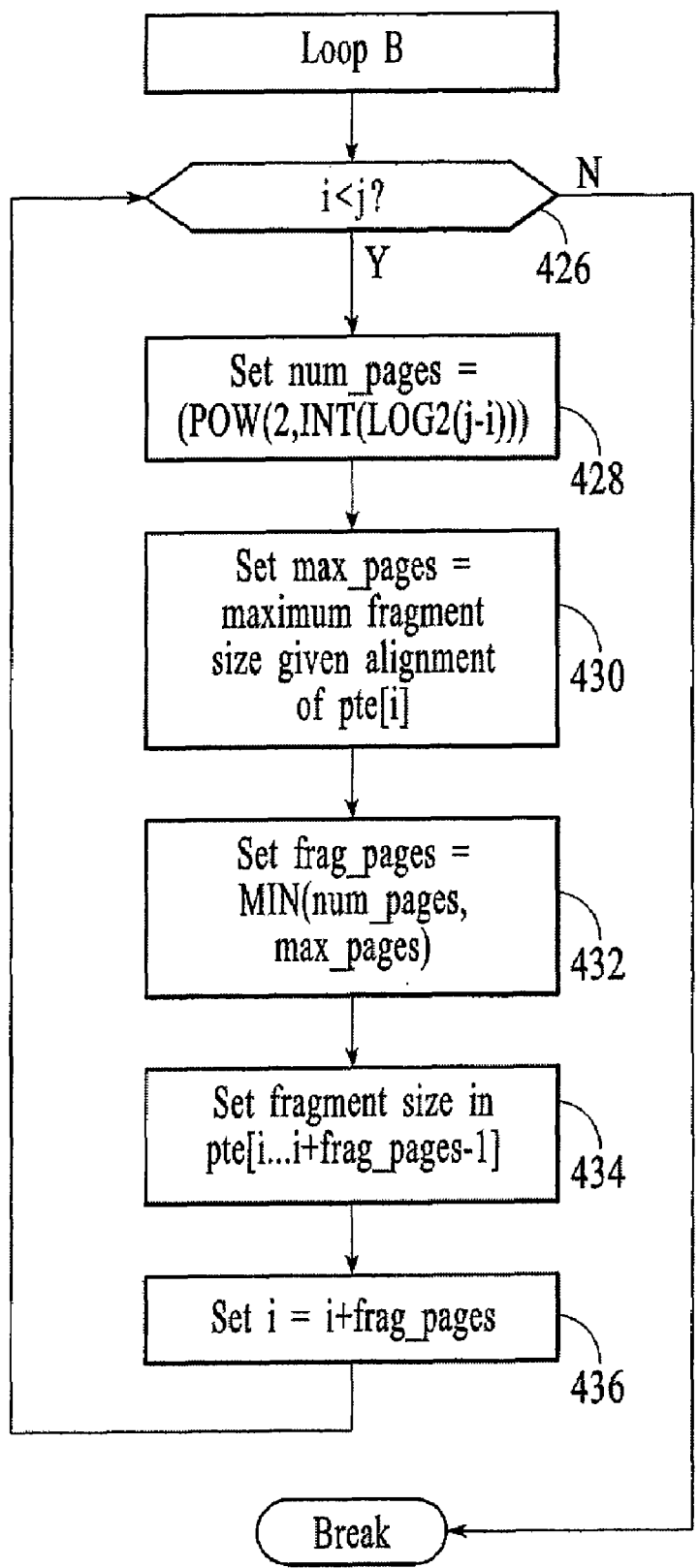

FIGS. 4A, 4B, and 4C collectively depict a flow diagram illustrating a process for determining fragmentation of a page table and for writing page table entries in accordance with an embodiment of the present invention.

Figure 5:
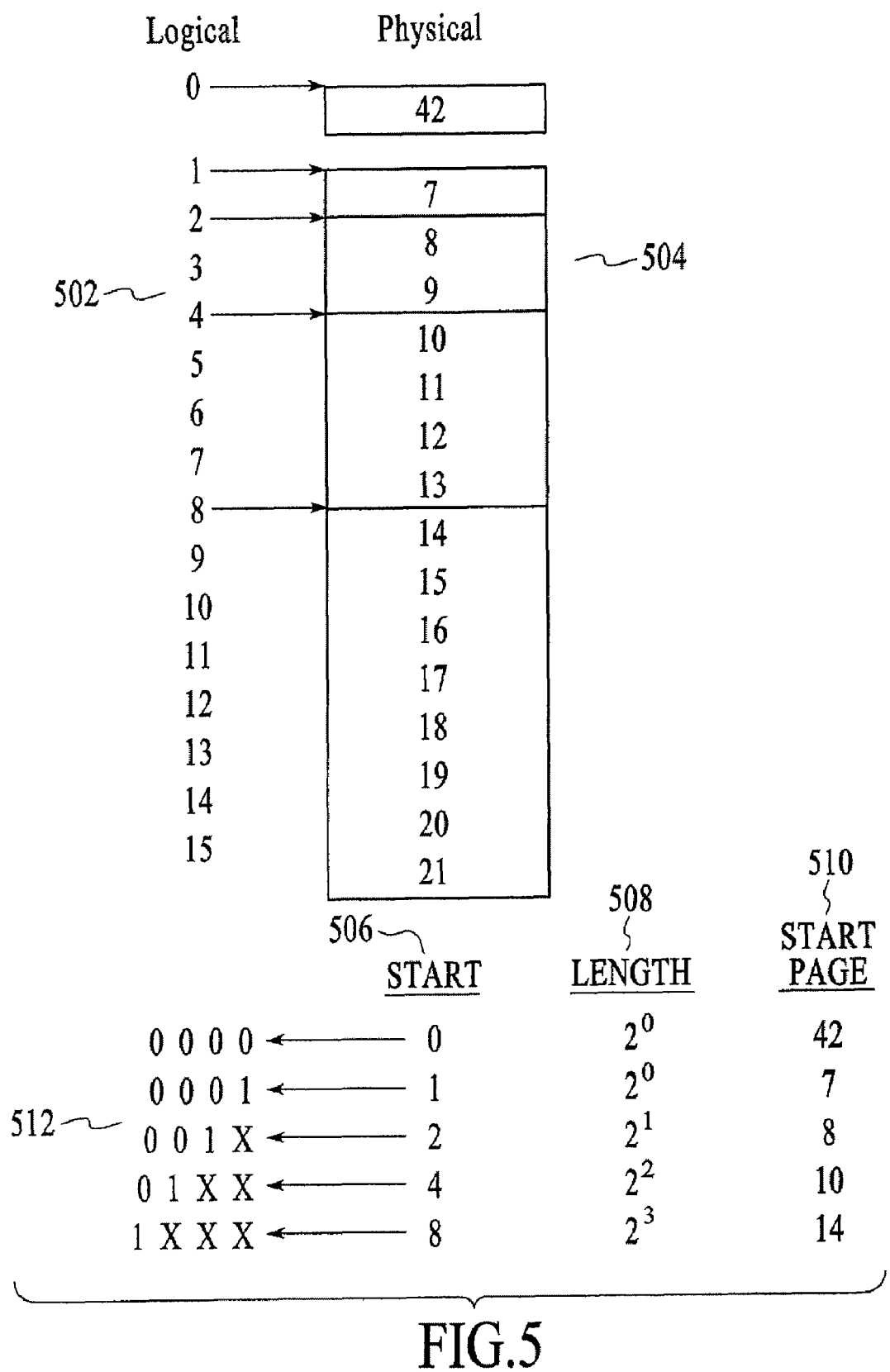

FIG. 5 depicts a block diagram illustrating an arrangement of memory addresses after application of the process depicted in FIGS. 4A, 4B, and 4C.

Figure 6:
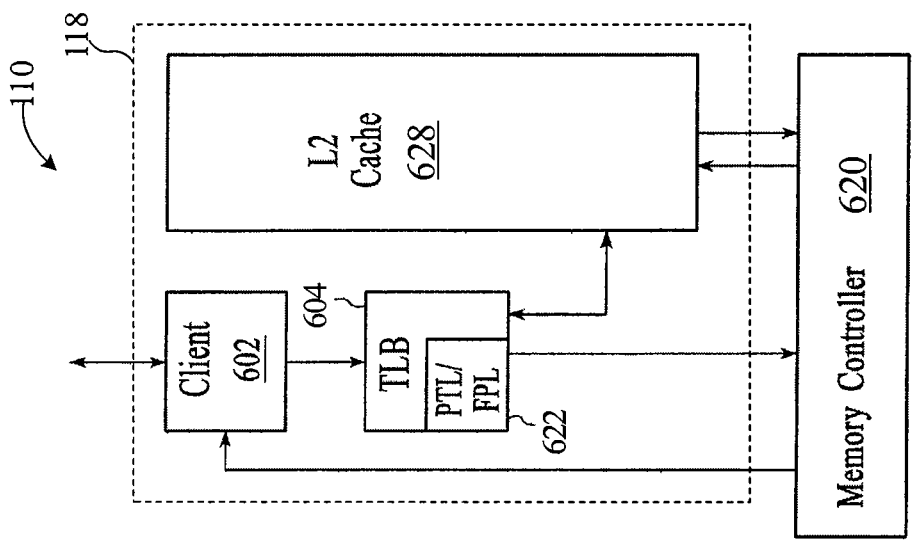

FIG. 6 depicts a block diagram of elements of a coprocessor, including one memory channel, in accordance with an embodiment of the present invention.

Figure 7:
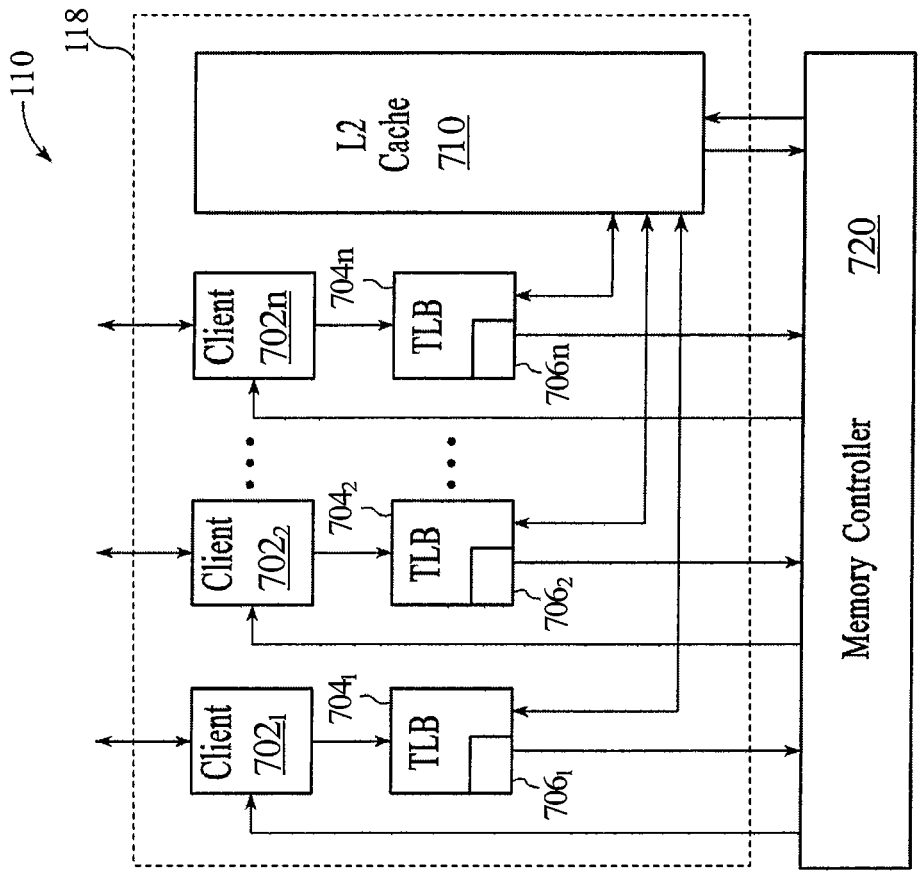

FIG. 7 depicts a block diagram of elements of a coprocessor, including multiple memory channels, in accordance with an embodiment of the present invention.

Figure 8:
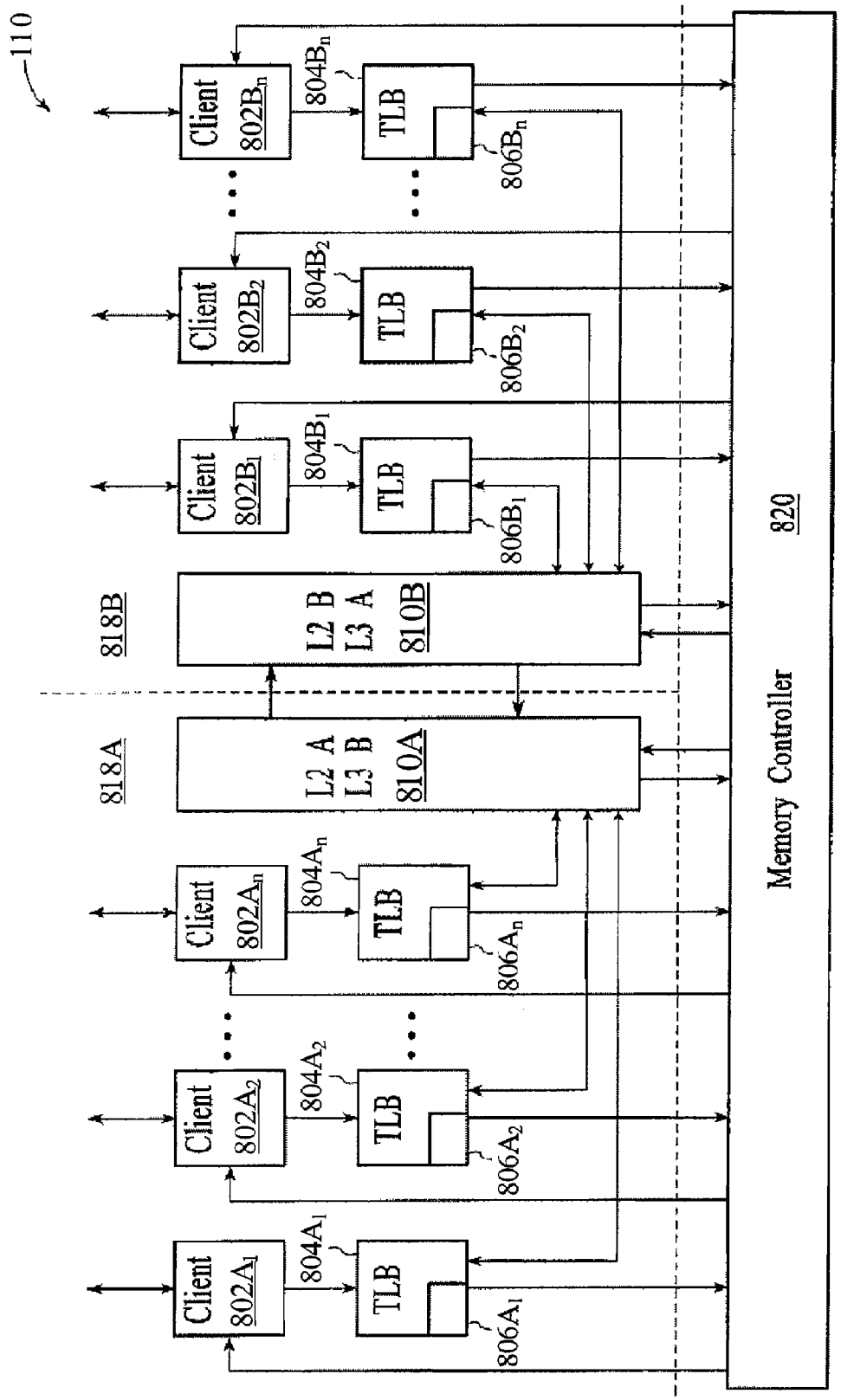

FIG. 8 depicts a block diagram of elements of a coprocessor, including two page table units, in accordance with an embodiment of the present invention.

Figures 3, 9:
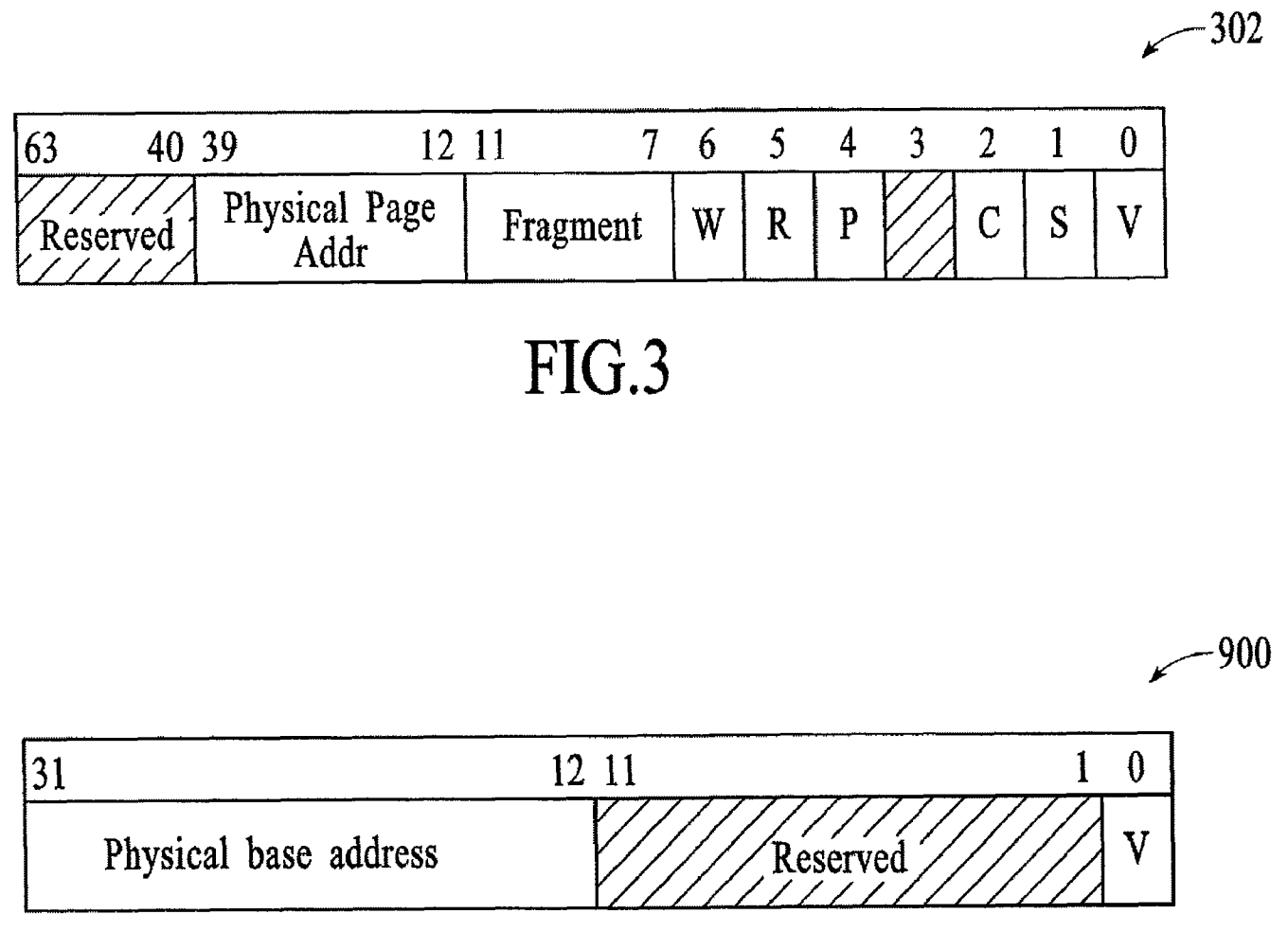

FIG. 9 depicts a block diagram of a page directory entry (PDE) format in accordance with an embodiment of the present invention.

Figure 10:
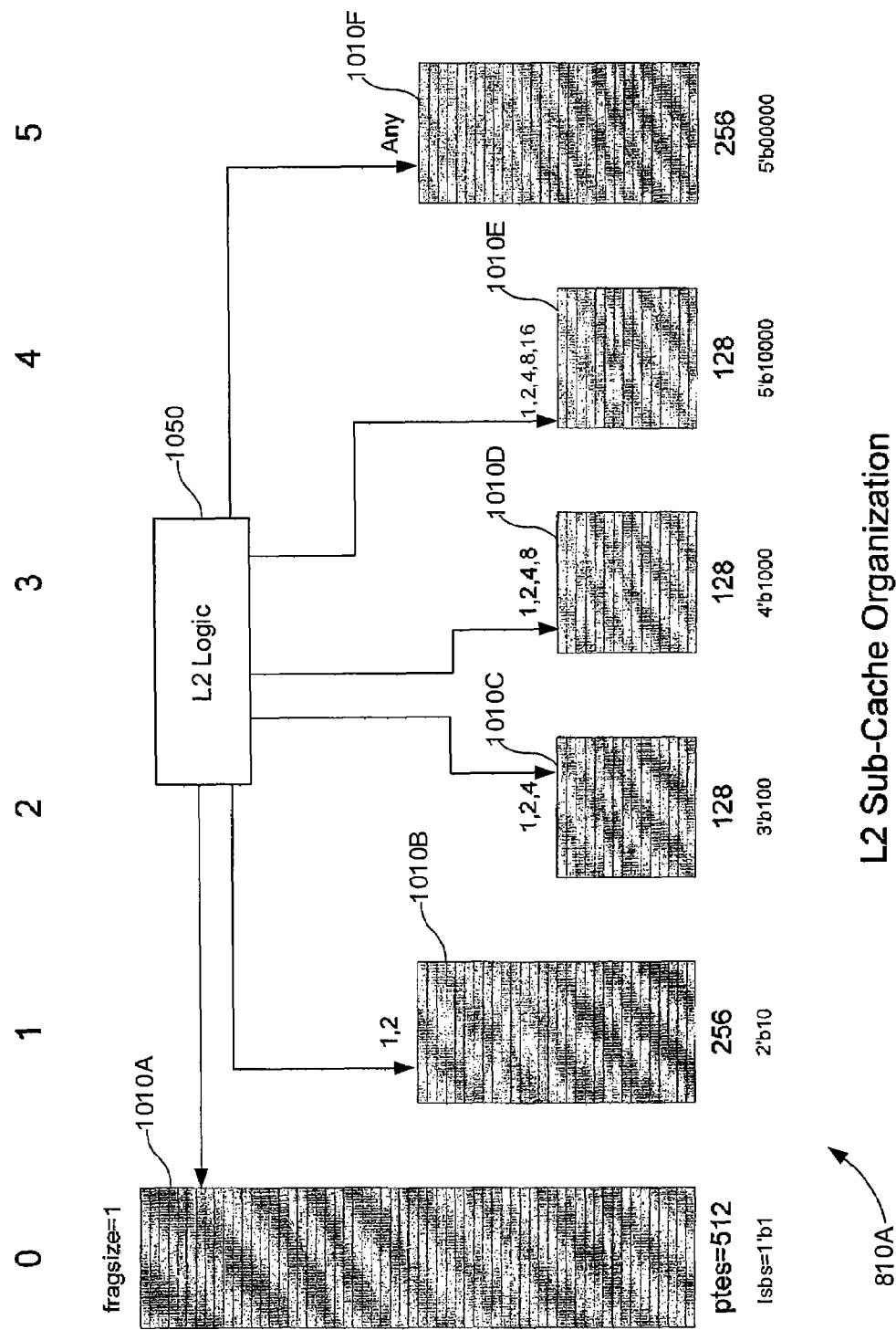

FIG. 10 depicts a block diagram of an example architecture of a level two (L2) cache in accordance with an embodiment of the present invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

I. Overview

Embodiments of the present invention are directed to a virtual memory system, including a cache, for accessing a physical memory and a method in a cache for mapping virtual memory to virtual memory and/or physical memory. As described in more detail herein, such a cache is organized into a plurality of parallel cache banks. The parallel cache banks are configured to store page table entries of a page table that is broken into fragments. The fragments of the page table are made up of pages that have equivalent attributes and are contiguous in logical memory space and physical address space. Fragments in logical memory begin on known boundaries such that the size of the fragment indicates the minimum boundary alignment. Corresponding fragments in physical address space can begin anywhere, thus making the process transparent to physical memory.

The page table entries are written to the page table by the operating system (OS), driver, or page table logic and fragment processing logic. Each page table entry (PTE) includes a fragment field that supplies a directive to a page table unit about the size of the fragment in which the designated page lies. In one embodiment, the directive is a power of two such that a value of 0 indicates a fragment size of one page or 4 k-bytes, a value of 1 corresponds to a two-page or 8 k-byte fragment, a value of 2 means a four-page or 16 k-byte fragment and so on. Using the fragment field implies that physical pages are contiguous within this fragment, and that the logical start address of the fragment is aligned on the corresponding fragment size boundary. Thus, with a fragment value of 3, the fragment size is 32 k-bytes or eight pages, and this fragment begins on a 32 k-byte boundary in logical, but not necessarily physical, address space.

The page table entries are distributed into the parallel cache banks of the cache based on fragment size and alignment boundary. If the cache receives a request for translation of a logical memory address, the request is issued in parallel to each cache bank. The logical memory address may be translated to another logical memory address or may be translated to a physical memory address. Due to the organization of the parallel cache banks, at most one of the banks will have a cache hit and return the requested data. If all the banks miss, then the requested data is a miss. In many ways, this is equivalent to supporting a dynamic page size where a fragment is equivalent to a dynamic page.

An embodiment of the present invention allows a TLB to read significantly fewer page table entries to determine whether there is a cache hit because the page table entries are organized into fragments. In this embodiment, incoming addresses are quickly compared in parallel against all page table entries in the TLB. When the physical address space can be allocated in a mostly contiguous pattern, the page table unit can use this a priori knowledge to reduce the number of cache misses.

That is, in accordance with an embodiment of the present invention, a logical memory address included in a fragment may be mapped into a physical memory address by any page table entry included in that fragment. For example, suppose a page table entry A and a page table entry B are included in a fragment Y. Then, a logical memory address included in fragment Y can be mapped to a physical memory address by either page table entry A or page table entry B. Thus, in this example, if either page table entry A or page table entry B is included in the TLB, there will not be a cache miss.

Another advantage of an embodiment described herein is that a large cache may also use such a priori knowledge of the fragmentation of the physical memory to read fewer page table entries. Typically, a large cache cannot use the a priori knowledge of the fragmentation of the physical memory to read fewer page table entries because a typical large cache includes too many page table entries to be compared in parallel to an incoming address. To overcome the shortcomings of such typical large caches, a cache in accordance with an embodiment of the present invention is organized into parallel cache banks. Page table entries are distributed into the parallel cache banks in such a manner that if the cache includes a page table entry corresponding to an incoming address, it is guaranteed to be in exactly one parallel cache bank. Each parallel cache bank may still be quite large, and may not be fully associative. Therefore, each page table entry may not be compared in parallel, but rather in a manner dependent upon cache group associativity.

Consequently, a large cache in accordance with an embodiment of the present invention may also use a priori knowledge of the fragmentation of the physical memory to read fewer page table entries.

Embodiments of the invention will be described with reference to a specific example of a system including a virtual memory system, a page table with a specific page size, and other details, but the invention is not so limited. In an example system used herein to illustrate embodiments of the invention, a virtual memory system is associated with a graphics processing unit (GPU) that interfaces with an operating system which dictates a page table configuration. However, embodiments as described are not limited to systems including a GPU, or to systems with the specific details described, but are applicable to any system in which a virtual memory system interfaces with a page table architecture.

It is noted that references in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In what follows, an embodiment of the present invention is described in which a cache, which includes a plurality of parallel banks, is implemented as an L2 cache. This is for illustrative purposes only, and not limitation. It is to be appreciated that such a cache may be implemented in other ways without deviating from the spirit and scope of the present invention. For example, in accordance with an embodiment of the present invention a cache that includes a plurality of parallel banks may be implemented as an L1 cache, an L2 cache, an L3 cache, or some other level cache as would be apparent to a person skilled in the relevant art(s).

Figure 1:
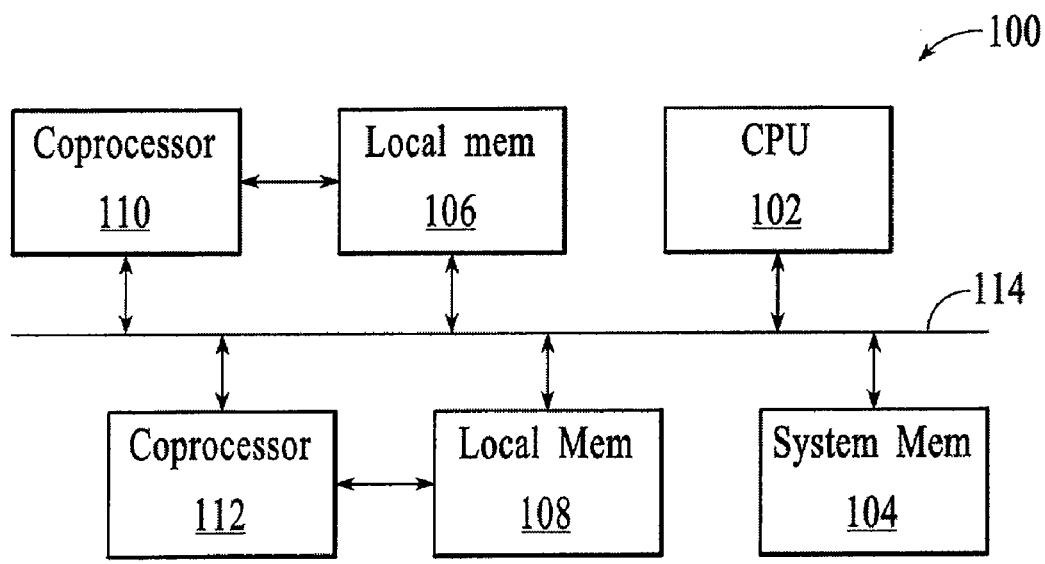
FIG. 1 depicts a block diagram of an example computer system including a coprocessor in accordance with an embodiment of the present invention.

II. An Example Computer System in Accordance with an Embodiment of the Present Invention Before describing a structure of an L2 cache in accordance with an embodiment of the present invention, it is helpful to describe an example computer system in which such an L2 cache may be implemented. FIG. 1 is a block diagram of a computer system 100 according to an embodiment. System 100 includes a central processing unit (CPU) 102, and a system memory 104. In general, system memory 104 stores data that could be accessed by any processor of system 100. A coprocessor 110 and a coprocessor 112 communicate with CPU 102 and the system memory over a bus 114. Bus 114 can be any type of bus used in computer systems, including a peripheral component interface (PCI) bus, an accelerated graphics port (AGP) bus, and a PCIE (PCI Express) bus.

Coprocessors 110 and 112 assist CPU 102 by performing certain special functions, usually much faster than CPU 102 could perform them in software. In some cases coprocessors 110 and 112 decode instructions in parallel with CPU 102 and execute only those instructions intended for them. Coprocessor 110 and/or coprocessor 112 may include, but are not limited to, a floating point coprocessor, a graphics processing unit (GPU), a networking coprocessor, and other types of coprocessors and processors as would be apparent to a person skilled in the relevant art(s).

System 100 further includes local memory 106 and local memory 108. Local memory 106 is coupled to coprocessor 110 and also coupled to bus 114. Local memory 108 is coupled to coprocessor 112 and also coupled to bus 114. The local memories 106 and 108 are available to coprocessors 110 and 112 respectively in order to provide faster access to certain data that is frequently or recently used by the respective coprocessors than would be possible if the data were stored in system memory 104.

Figure 2:
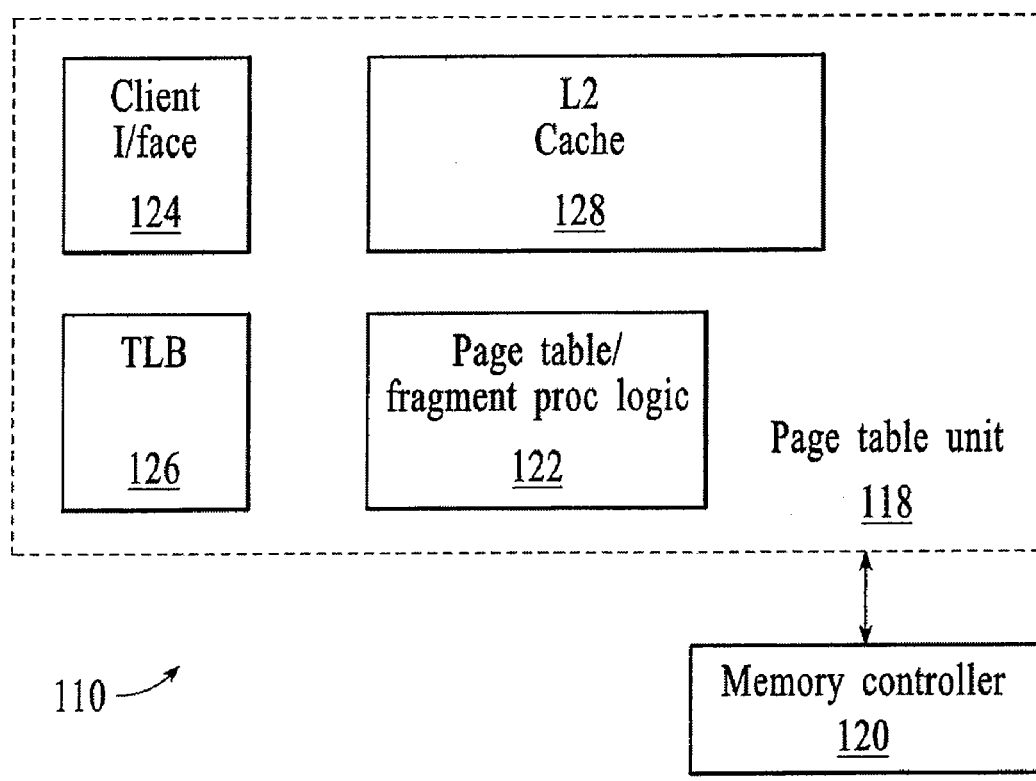
FIG. 2 depicts a block diagram of a coprocessor in accordance with an embodiment of the present invention.

FIG. 2 is a block diagram of components of coprocessor 110 in accordance with an embodiment in which coprocessor 110 includes a graphics processing unit (GPU) functionality. Coprocessor 110 includes a memory controller 120, and a page table unit 118. Page table unit 118 includes page table logic/fragment processing logic (PTL/FPL) 122, memory client interface 124, level 1 (L1) TLB 126 and level 2 (L2) cache 128. TLB 126 functions both as a L1 cache and a translation lookaside buffer (TLB) for the L1 cache.

In one embodiment, coprocessor 110 can receive requests for memory access from more than thirty memory clients that make read and write requests to memory controller 120. Most of the memory clients are virtual clients that can run in a logical memory space. The client interface 124, PTL/FPL 122, and the memory controller 120 facilitate access to data on behalf of these memory clients. Among other functions described below, PTL/FPL 122 performs logical address to physical address translations and accesses a page table. In one embodiment, physical page tables exist in local memory 106, and the registers specifying their locations utilize physical memory addresses. The architecture of the page table is dictated by an operating system of CPU 102. Some of the memory clients may be only physical, in that they bypass the virtual memory logic entirely and can make requests directly to, and get data directly back from, local memory 108 or system memory 104.

Memory client interface 124 receives and responds to requests from memory clients. TLB 126 and L2 cache 128 store certain data and provide faster access to the data than if the data were stored elsewhere, as will be further explained below.

III. An Example Page Table Entry in Accordance with an Embodiment of the Present Invention FIG. 3 is a diagram of an example page table entry (PTE) 302 in accordance with an embodiment of the present invention. In one embodiment, each page in the page table is 4 k-bytes in size. In the embodiment of FIG. 3, each PTE 302 is a 64-bit (8 byte) word.

There is one PTE 302 for each 4 k-byte logical page of addressable memory. This allows the page table logic to generate up to 40 bits of output given a 32-bit input address. The lower 40 bits of 64-bit PTE 302 are used for translation purposes.

PTE 302 includes a 28 bit Physical Page Address field containing a physical 4 Kb-aligned aligned base address of a mapped page. A V(alid) bit indicates whether the given PTE 302 contains a valid mapping. If a request is made to an invalid page, then a valid protection fault occurs. Depending upon how the page table control registers are programmed in various embodiments, this condition may cause writes to be dropped and may perform reads from default pages. Alternatively, the page table unit arranges to interrupt the host and possibly initiate a coprocessor context switch.

In embodiments described herein, a context implies a page table and the set of registers used to manipulate the page table. Each context has its own page table. There can be multiple, independent page tables active at one time. In one embodiment, flat page tables are implemented. In other embodiments, multi-level pages tables or some combination of multi-level and flat page tables are used. A page table is a mapping of virtual space to physical space. In various embodiments, there are up to eight different mappings. However, more than eight mappings may be used without deviating from the spirit and scope of the present invention. Each mapping can be managed independently of all the other mappings.

Context switching includes changing out one page table for another. This entails saving state for non-current contexts. Context switching avoids inefficient down-time when one page table is being modified. Clients that run together are grouped to make the context switching more efficient. In various embodiments, a context field (not shown) allows contexts to be specified on a per-memory-access-request basis.

A S(ystem) bit indicates whether a page is located in local memory or system memory. This bit indicates when data must be read or written over the PCIE bus.

A C(ache) snooping bit indicates that read/write accesses to the page must be made using a snooped cycle. The cache snooping bit is useful when writing to memory pages, as it alerts processors on the bus that cached data may have to be invalidated.

Three access protection bits are available. A W(rite) bit indicates that the given page can be written. A R(ead) bit indicates that the given page can be read. A P(rivileged) bit indicates a page that can only be accessed when the context requesting access is operating in a privileged mode. In another embodiment, the privileged mode is set on a per request basis.

The fragment field provides directives to page table unit 118 regarding the degree of fragmentation of the physical address space and allows for significant optimization of TLB 124 hit rates when fragmentation is low (that is, fragments are relatively large). The remaining bits of PTE 302 are reserved, and in one embodiment, are set to 0.

In each PTE 302, the 5-bit fragment field supplies a directive to page table unit 118 about the size of the fragment in which the designated page lies. The size of the fragment is a power of two such that a value of 0 indicates a fragment size of one page or 4 k-bytes, a value of 1 corresponds to a two-page or 8 k-byte fragment, a value of 2 indicates a four-page or 16 k-byte fragment, and so on. In general, the size of the logical or physical fragment size in bytes can be expressed as shown below.

$$\text{Logical/Physical fragment size in bytes} = 2^{(12+fragment)} \quad \text{Equation 1}$$

Using the fragment field implies that physical pages are contiguous within this fragment, and that the logical start address of the fragment is aligned on the corresponding fragment size boundary. Thus, with a fragment value of 3, the fragment size is 32 k-bytes or eight pages, and this fragment begins on a 32 k-byte boundary in logical, but not necessarily physical, address space. In one embodiment, each PTE 302 in the corresponding page range must be programmed with the same fragment value, as well as having the same W, R, P, S, C and V attributes. When the physical address space can be allocated in a mostly contiguous pattern, page table unit 118 can use this a priori knowledge and significantly reduce the number of TLB 126 misses. In one embodiment with a 4 G-byte logical address space, a value of twenty in the fragment field implies that the entire 4 G-byte logical address space is physically contiguous and only one PTE 320 need ever be read.

In one embodiment, a host driver is responsible for constructing the fragment value in each PTE 302. If the host driver elects not to do any special fragment processing, then the fragment value is 0, and the physical memory is treated as fully fragmented in 4 k-byte pages from the viewpoint of page table unit 118. In an embodiment in which PTE 302 contains a non-zero fragment size that is fetched into TLB 126, the tag representing that logical base address and the physical base address stored in PTE 302 is adjusted as shown below to match the start of the designated fragment.

$$\text{PTE Physical Fragment} = \text{PTE Physical Page} - (\text{Logical Page } \& \ (2^{fragment\text{-}size}-1)) \quad \text{Equation 2}$$

$$\text{Logical Fragment} = \text{Logical Page } \&\sim(2^{fragment\text{-}size}-1) \quad \text{Equation 3}$$

Tag comparators also take the fragment size into account when looking for matches in TLB 126. The comparison treats the lower fragment bits of the tag address field as 0 when looking for per-entry matches.

When computing the physical address of a page given its logical address within a fragment, the following computation applies.

$$\text{Physical Page} = \text{PTE Physical Fragment} + (\text{Logical Page } \& \ (2^{fragment\text{-}size}-1)) \quad \text{Equation 4}$$

IV. An Example Method for Determining Fragmentation of a Page Table In Accordance With An Embodiment Of The Present Invention In one embodiment, PTL/FPL 122 calculates the fragment values in a page table after physical page allocation by CPU 102 of FIG. 1. FIGS. 4A, 4B, and 4C are flow diagrams illustrating a process of determining fragmentation of the page table and calculating fragment values to be written to PTEs. As described in more detail below, the process breaks memory up into aligned pieces, including finding the largest fragment that can be aligned on a boundary of a given size in logical memory space, and it updates the fragment size accordingly.

The process starts in FIG. 4A with defining PTE fields as shown at 404. This includes defining W, R, P, C, S, V, fragment, and base address fields as unsigned integers. Defining PTE fields further includes assigning a value (1 or 0) to indicate "true" for the W, R, P, C, S, and V fields. For the V field, "true" means the PTE contains a valid mapping. If a request is made to an invalid page, then a valid protection fault occurs.

Depending upon how page table control registers are programmed, this condition may cause writes to be dropped and reads to occur from default pages. Alternatively, page table unit 118 can arrange to interrupt the host and possibly initiate a GPU context switch.

For the S field, "true" indicates that a page is located in system memory rather than local memory. The S bit indicates when data must be read or written over the PCIE bus. For the C field, "true" indicates that read/write accesses to this page must be made using a snooped cycle. This bit is useful, for example, when writing to system memory pages, as it alerts other processors on the bus that cached data may have to be invalidated.

For the P field, "true" indicates a page that can only be accessed when page table unit 118 is operating in privileged mode or on behalf of a privileged request. For the R field, "true" indicates that the page can be read. For the W field, "true" indicates that the page can be written.

Defining PTE fields further includes defining the fragment field as a 5-bit field, and the base address field as a 28-bit field. Two reserved fields are defined as having sizes of 1-bit and 24-bits, respectively.

At 406, a function called "Compatible" is defined. This function is used to compare pages and determine whether pages have matching W, R, P, C, S, and V fields.

For a set of pages to belong to a same fragment, they must be compatible, in that they have identical values in the indicated fields.

At 408 an index i is initialized to a value that indicates the start of the page table.

At 410, it is determined whether the end of the page table has been reached by comparing i to a value that indicates the end of the page table. If the end of the page table has not been reached, loop A, which is illustrated in FIG. 4B, is executed.

Referring to FIG. 4B, the process labeled loop A is illustrated. Loop A builds up a list in physical address space by finding a range of indices that are all contiguous and all have the same properties. Then it will stop. It finds a contiguous region that is also compatible (all attributes are the same). Loop A begin at 418 by setting an index j equal to i+1. At 420, it is determined whether j is less than the page table size. If j is less than the page table size, page table entry pte[i] is compared with page table entry pte[j] to determine whether the two page table entries are both compatible and contiguous. If pte[i] and pte[j] are both compatible and contiguous, then j is incremented by setting j=j+1, and the process returns to 420 to determine whether j is less than the size of the page table. If pte[i] and pte[j] are not both compatible and contiguous, the process breaks.

As long as j is less than the size of the page table, and contiguous and compatible PTEs continue to be found, the process continues to assemble a contiguous, compatible range of pages. If j is not less than the page table size, the process breaks. Referring again to FIG. 4A, when the loop A process of FIG. 4B breaks, loop B is executed as shown in FIG. 4C.

The process of FIG. 4C breaks the contiguous, compatible range of pages into aligned sections. That is, groups of contiguous, compatible pages are aligned to start on power-of-two boundaries, and to contain a power-of-two number of pages. For example, if the fragment size is two, it is a four page (16 k-bytes) fragment. That means in logical address space, it is aligned on a 16 k-byte boundary. This allows the coprocessor to know where to look for the start of the current fragment by knowing only the fragment size. However, in physical address space, there is no restriction on where a page or fragment can start. In physical address space, the only restriction is that fragments must be contiguous, as they are in logical space.

The process of FIG. 4C begins by determining whether i is less than j at 426. If i is less than j, a variable num_pages is set to POW(2,INT(LOGO(j-i))) at 428. Then, at 430, a variable max_Pages is set to the maximum fragment size given the alignment of pte[i]. A fragment may contain up to but not more than the number of pages indicated by the power-of-two boundary. For example, a 16 k-byte boundary can start a fragment with one, two, or four contiguous, compatible pages.

At 432, a variable called frag_pages is set to MIN(num_pages, max_pages).

Then, at 434, the fragment size is set to pte[i. . .i+frag_pages-1]. At 436, i is set to i+frag_pages. The process of 428 through 436 continues until i is not less than j, at which time the process breaks.

To summarize, loop B determines a kind of boundary for a given iteration and attempts to find a fragment of that size. For example, if a current iteration of loop B is processing an 8 k-byte boundary (implying two pages), loop B attempts to find at most two pages in the current fragment. If it does find the two pages, loop B assigns these two pages to a single fragment having a fragment size of one ($2^1$). Loop B updates the fragment size by writing out the fragments as it goes.

If there are more pages to go in this fragment, then it loops back again, and it will bump up to the next boundary. For example, if the last boundary was an 8 k boundary, the next one is a 16 k boundary.

The process of loop B tries to find the largest boundary it was on last time. For example, having been on an 8 k boundary, it knew it was not on a 16 k boundary; so if it was able to fill that 8 k fragment, it knows next time it is going to be on a 16 k boundary.

Then it tries to look for four consecutive pages. The process does this in rotation; that is it looks for 16 k, then 32 k, etc. The process continues to try to build up larger and larger fragments. When the process nears the end it will eventually encounter fragments that are too large, meaning there is not enough left to fill them. The available pages are then broken up into $2^n$ size chunks and placed on like-sized boundaries. A chunk larger than the boundary size it is on will not be created. But even at this latter stage of the process, pages can still be coalesced at some intermediate boundary.

There may be instances in which, for example, loop B is able to fill a two-page fragment, but only three contiguous pages can be found in a next loop. The process then breaks the section into pieces, places the two page (8 k) fragment on the 16 k boundary, and comes back around and places the loner (4 k) page at the next 8 k boundary.

Performance of the system is improved even with these small fragments. Performance of the system can be dramatically improved with larger fragments.

Referring again to FIG. 4A, when loop B breaks, the process returns to 410 to determine whether i is less than page_table_end. If i is not less than page_table_end, at 416 remaining fragments are coalesced. Specifically, fragments before the start of the FIG. 4A process and after the end of the FIG. 4A process are coalesced.

In an alternative embodiment, the memory is allocated in fixed power-of-two sized chunks on same-sized boundaries in logical space. In this case, fragment sizes are assigned at allocation time, and do not have to be recomputed. However, if portions of the same-sized chunks are deallocated, a process such as that described with reference to FIGS. 4A, 4B, and 4C can compute fragments again. It is possible to limit the memory space in which the process is executed to those portions of the memory space that have been changed.

In one embodiment, a coprocessor is notified of updates to the page table. The coprocessor also has last access to the page table when it is allocated or changed, and the coprocessor actually writes the page table out. In various embodiments, the foregoing actions can be performed by a coprocessor, a processor, a driver, or the OS.

FIG. 5 is a diagram that illustrates an arrangement of memory addresses after the process of FIGS. 4A, 4B and 4C. A physical memory map 504 is shown in the right of the diagram. Memory map 504 is broken into fragments of contiguous, compatible pages.

As previously explained, there are no restrictions on where (at what physical addresses) fragments may start in physical memory. The physical memory addresses are indicated in the memory locations as shown. For example, address 42 at the top of the diagram indicates a one-page fragment with a starting address of 42. Below address 42 is a one-page fragment with a starting address of 7. Below address 7 is a two-page fragment with a starting address of 8, and so on.

On the left of the diagram, corresponding logical addresses 502 are shown.

Referring to the bottom of FIG. 5, a summary indicates logical fragment start addresses 506, corresponding fragment lengths 508, and corresponding physical fragment start page addresses 510.

The logical address boundary 0 implies a fragment of length up to $2^m$ pages, where m=int(log$_2$ memory size). As shown, this corresponds to a physical page that starts at 42. The next fragment starts at logical address 1 and has a length of $2^0$ pages, or one page, and corresponds to a physical fragment starting at 7. As explained, a fragment at a $2_n$ boundary may have a length in pages of up to, but not more than, $2^n$. The next fragment begins at logical address 2 and has a length of $2^1$ pages, or two pages, and corresponds to a physical fragment starting at 8. The next fragment begins at logical address 4 and has a length of $2^2$ pages, or four pages, and corresponds to a physical fragment starting at 10. The next fragment begins at logical address 8 and has a length of $2^3$ pages, or eight pages, and corresponds to a physical fragment starting at 14.

Column 512 shows the number of least significant bits that can be ignored during a lookup given the various starting logical addresses. Bits marked "X" are "don't cares".

This illustrates how wildcarding becomes possible when fragment are aligned so that fragment boundaries convey both the starting address of the fragment and the size of the fragment.

An alternative to using aligned fragments is using ideal fragments, which can start on any boundary. To use ideal fragments, an additional field in the PTE is used to indicate a starting address. There are tradeoffs, including area and speed, between using aligned fragments and ideal fragments. With ideal fragments, the starting address field may be the same size as the physical address field, or may be an offset from the logical page represented by the PTE. But this field would have to grow larger as the maximum fragment size increased. The size of the field could be restricted, but if a fragment of any size can start on any boundary, then the starting address field is the same size as the physical page address.

Fewer bits for the starting address field can be used if the fragment size is restricted. The field can then be used as an offset from whatever physical address is pointed to by the PTE. This may impose its own restrictions because limiting the fragment size may limit or eliminate certain configurations.

One factor that affects the use of aligned fragments or ideal fragments is the degree of expected fragmentation. Zero percent fragmentation implies one fragment for the entire memory space, while 100% fragmentation implies one page per fragment. The speedup (or increase in hit rate) realized as a function of fragmentation reduction is a linear function with ideal fragments. The speedup realized as a function of fragmentation reduction is a log function with aligned fragments.

V. Example Embodiments of a Coprocessor that Includes an L2 Cache in Accordance with Embodiments of the Present Invention FIG. 6 through FIG. 8 are block diagrams that further illustrate embodiments of coprocessor 110. FIG. 6 is block diagram illustrating an embodiment in which coprocessor 110 includes one memory channel. In this embodiment, coprocessor 110 includes a client interface 602, a TLB 604 which includes page table logic/fragment processing logic (PTL/FPL) 622, an L2 cache 628, and a memory controller 620. Client interface 602, TLB 604 and L2 cache 628 may be included in page table unit 118.

Among other things, the memory channel performs translations of logical addresses seen by memory clients into physical addresses seen by a memory controller.

A client interface or "client" 602 is an interface between a single memory client and a memory controller 620. A memory client can be any application requiring access to physical memory. For example, a texture unit of a GPU is a memory client that makes only read requests. Clients that are exterior to the coprocessor of FIG. 6 may also access memory via the client interface 602, including any other processes running on any hosts that communicate via a common bus with the coprocessor of FIG. 6.

The client interface 602 allows the client to make requests through TLB 604, which is a dedicated L1 TLB. Usually, TLB 604 performs operations on the request, such as an address translation, either locally based on information stored in TLB 604 or, in the case of a TLB miss, through L2 cache 628. TLB 604 includes PTL/FPL 622. PTL/FPL 622 keeps track of the size of the fragment in which a logical page exists. PTL/FPL 622 can perform a comparison over a much larger range, limited only by the size of that fragment, than just e.g., eight single-page entries.

Memory controller 620 of the coprocessor includes an interface to TLB 604. L2 cache 628 has its own interface to memory controller 620. L2 cache 628 makes physical accesses to memory and does not require virtual memory or address translation.

Memory controller 620 and the client interface 602 communicate through a direct route, as shown. This route is used, for example, when returning data to the client. It is also used for acknowledgements for writes, or actual data for reads. Such returning data does not have to go through TLB 604.

TLB 604 performs a L1 cache lookup on an address associated with an input/output (I/O) request received from its client. If the translation can be performed based on data already present in TLB 604, then the associated I/O request is forwarded to memory controller 620 with a physical address in place of the previous logical address. If the translation cannot be performed, a separate request to update TLB 604 is forwarded to L2 cache 628. If the requested data is already present in L2 cache 628, it will be transferred to the requesting TLB 604 where the translation process will proceed as before. If the requested data is not present, L2 cache 628 must retrieve a portion of the memory-resident page table from local memory (not shown) via its own interface to memory controller 620. Various levels of latency may exist in TLB 604 and L2 cache 628 depending on the ultimate location of the requested mapping data. Therefore, embodiments also include several latency compensation data structures in which to temporarily store request data while the translation data returns out of order.

In one embodiment, the client interface 602, TLB 604, and L2 cache 628 are components of page table unit 118, but the invention is not so limited.

In an embodiment, L2 cache 628 includes a plurality of parallel cache banks, which enable L2 cache 628 to integrate fragment boundary checking into its hit/miss determination logic, as described in more detail below. Fragment checking logic included in TLB 604 enables TLB 604 to achieve an enhanced hit rate for memory requests to the same fragment. In a similar manner, organizing L2 cache 628 into the plurality of parallel cache banks reduces the number of expensive L2 cache misses to the same fragment.

FIG. 7 is a block diagram of elements 700 of another embodiment of a coprocessor. In the embodiment shown, multiple memory channels provide memory access for multiple clients. Client interfaces $702_1$, and client interfaces $702_2$ through $702_n$, include more than thirty client interfaces. Each client interfaces 702 is an interface from a single client to a memory controller 720. Each of client interfaces 702 communicates with a dedicated TLB 704. TLBs $704_1$, through $704_n$, are shown. Each of TLBs 704 includes a PTL/FPL 706. PTL/FPLs $706_1$, through $706_n$, are shown. Each TLB 704 is connected to memory controller 720.

Each TLB 704 performs a L1 cache lookup on an address associated with an input/output (I/O) request received from its client in a similar manner to TLB 604 described above. Each TLB 704 is further connected to L2 cache 710 for processing TLB misses. L2 cache 710 has its own interface to memory controller 720. L2 cache 710 makes physical accesses to memory and does not require virtual memory or address translation.

Memory controller 720 and client interfaces 702 communicate through a direct route, as shown. This route is used, for example, when returning data to the client. It is also used for acknowledgements for writes, or actual data for reads. Such returning data does not have to go through TLB 704.

In an embodiment, L2 cache 710 includes a plurality of parallel cache banks, which enable L2 cache 710 to integrate fragment boundary checking into its hit/miss determination logic, as described in more detail below. Fragment checking logic included in TLB 704 enables TLB 704 to achieve an enhanced hit rate for memory requests to the same fragment. In a similar manner, organizing L2 cache 710 into the plurality of parallel cache banks reduces the number of expensive L2 cache misses to the same fragment.

FIG. 8 is a block diagram of elements 800 of an embodiment of a coprocessor in which two page table units are used, thus duplicating the L2 cache functionality. This embodiment and its elements will be described in detail with reference to FIG. 8. A page table unit 818A and a page table unit 818B include similar elements and communicate with each other through respective L2 caches 810A and 810B.

Each page table unit handles roughly one-half of the memory clients. Extensive performance modeling of various page table unit configurations has shown significant performance enhancement when each L2 cache 810 can access the other L2 cache 810 as an effective L3 cache. This can be done with a minimal number of wires, and thus is an efficient design.

A function of each page table unit 818 is to perform logical to physical address translations on behalf of memory clients making requests to the memory controller. This translation is based on page table data located in local memory. The translation is page-based with a fixed page size of 4 K (4,096) bytes. It supports a logical address space of up to 4 G (4,294,967,296) bytes or 1 M (1,048,576) pages. Each page is represented as a 64-bit page table entry (PTE) in the physical page table. In one embodiment, forty bits are used for actual address generation. Accordingly, in one embodiment the supported physical address space range can span 1 T (1,099,511,627,776) bytes using sparse allocation. As previously described, each PTE contains a 28-bit page base address, a valid bit, system bit, cache snooping bit, read, write and privileged access bits, and a 5-bit fragment size field. All other bits are reserved.

Page table units 818 support up to eight active physical page table contexts simultaneously. A first page table context 0 is reserved for the so-called system context. The remainder can be assigned at will, but in one embodiment various clients each have their own independently managed page table contexts. Types of clients include for example, video, multimedia, and 3D graphics clients. In one embodiment, multimedia clients use a context that is independent from the 3D graphics client context.

Page table unit 818A includes client interfaces 802A$_1$, and 802A$_2$ through 802A$_n$. Client interfaces 802A receive memory access requests from respective memory clients and communicate the requests to respective TLBs 804A$_1$, through 804A$_n$. TLBs 804A each access a memory controller 820. Each of TLBs 804A$_1$, through 804A$_n$ includes a respective one of PTL/FPLs 806A$_1$, through 806A$_n$.

Page table unit 818A further includes L2 cache 810A, which has its own interface to memory controller 820. As will be explained further below, L2 cache 810A serves as a L2 cache for TLBs 804A, and as a L3 cache for TLBs 804B of page table unit 818B.

Page table unit 818B includes client interfaces 802B$_1$, and 802B$_2$ through 802B$_n$. The client interfaces 802B receive memory access requests from respective memory clients and communicate the requests to respective TLBs 804B$_1$ through 804B$_n$. TLBs 804B access memory controller 820. Each of TLBs 804B$_1$, through 804B$_n$ includes a respective one of PTL/FPLs 806B$_1$ through 806B$_n$.

Page table unit 818B further includes L2 cache 810B, which has its own interface to memory controller 820. As will be explained further below, L2 cache 810B serves as a L2 cache for TLBs 804B, and as a L3 cache for TLBs 804A of page table unit 818A.

In one embodiment, each TLB 804 (in page table units 818A and 818B) is a relatively small fully associative cache that does fast address translations. Various sizes of TLB 804 can be used, for example to accommodate the performance requirements of various clients. In one embodiment, two sizes of TLB 804 are used for different classes of clients, a relatively larger TLB 804 for relatively higher-performance clients, and a relatively smaller TLB 804 for relatively lower-performance clients. The two sizes are assigned to different classes of clients as appropriate. Because the PTL/FPL 806 keeps track of the size of fragment in which a logical page exists, it can actually perform a comparison over a larger range, limited only by the size of that fragment, than just the number of entries in TLB 804. A comparison can thus be performed over a larger search space.

If page table mode is not enabled, incoming requests from memory clients are forwarded directly to memory controller 820 with no additional latency. When page table mode is enabled, a per-request translate signal along with a context field determines how any lookups are performed. If translation is on, the per-request context field selects the associated page table context. If translation is off, the address is first checked against an aperture range, and if it is within that range, the address will be looked up using system context 0. If outside that range, the address may be treated as physical, or even ignored depending upon register settings.

As the first step in the actual address lookup process, addresses associated with requests from memory clients are checked against the entries in TLB 804. If the address already matches one of the entries from TLB 804, the requesting address is transformed from logical to physical address space and the request is forwarded to memory controller 820. For reads, a tag associated with each request allows the originating memory client to identify returning data independent of the change in logical to physical addresses. Similarly, for writes an index field allows for write notification.

If the address cannot be translated by TLB 804, then the upper twenty bits of the page address and the page table context field (from the client) are passed to L2 cache 810. Significant latency may occur here, so the data associated with the request (including any write data) is saved in a latency compensation queue according to a hit-under-miss scheme. In various embodiments a miss-under-miss scheme is also implemented for latency compensation. An index that identifies the queued entry is also passed to L2 cache 810 so that returning data can be associated with the original request. In one embodiment, the return data is a 28-bit physical page address, a 5-bit fragment field, one system bit, one snooping bit, and one fault bit along with the original request index. If a fault occurred during translation in L2 cache 810, TLB 804 client will drop writes or substitute reads from a default page. When no fault occurs, the new PTE data replaces one of those already in TLB 804, and processing continues as described for the initial hit case.

In other embodiments, the entries in the work queue of TLB 804 are actually small state machines that act to optimize miss-under-miss processing. In particular, if multiple entries are waiting to submit similar requests to TLB 804, or waiting to submit similar requests to L2 cache 810, the fact that one of the group submits to the resource is recognized by the others and all wait for return data to be broadcast back to them all at a later time. This can significantly reduce request traffic to the resource under such conditions; this can happen any time a burst of activity starts when a memory client or group of clients open a new page for reading/writing.

Each L1 TLB latency compensation queue entry contains the following data: a context field; a memory address; an ending mode field; a size field (read clients only); a tag field (read clients only); an index/tag tag field (write clients only); a mask field (write clients only); and a write data field (write clients only).

Fragment size checking is handled by PTL/FPLs 806. This involves matching addresses based on the contents of the fragment field in addition to the designated tag data. This provides the advantage of a potentially dramatic decrease in miss rates because if a logical address is within a fragment corresponding to a page table entry included in TLB 804, then there will be a cache hit, even if the page table entry corresponding to that logical address is not included in TLB 804. In general, the control flow in response to a memory request follows this sequence:

if page tables disabled, submit request with assumed physical address to memory controller (MC) (done);

if translation disabled and logical address outside system aperture, either treat as physical or ignore by dropping writes or submitting default reads (done);

if translation disabled and inside system aperture, use system context 0 in place of context selected at interface;

if translation enabled, use context specified at memory client interface;

check logical address to see if it matches tag from TLB using page and fragment processing;

if matching tag found, compute physical address and submit request to MC (done);

otherwise, save request data and pass context, page address, request ID to L2 for fetching PTE;

on PTE return and no fault, store in TLB after adjusting fragment base addresses;

if fault occurred, drop writes or substitute read from default page (done);

otherwise, pass returned physical address and submit request to MC (done).

In various embodiments, there are multiple read memory clients and multiple write memory clients, not all of which require page table interfaces. For example, in one embodiment, there are more than 20 read memory clients and more than ten write memory clients. As previously discussed, there are various classes of clients and various TLB sizes. The relatively larger TLBs have larger latency compensation structures than do the relatively smaller TLBs. Client assignments to page table units can be designed to reflect the physical layout of the chip, and the relative numbers of client classes between the two units may become somewhat unbalanced as a result. In some cases, dummy clients are inserted to keep the numbers of each class of client the same for each of page table units 818A and 818B.

A function of L2 caches 810 and associated logic is to receive secondary requests for PTEs from the multiple TLBs 804. In an embodiment, L2 cache 810 includes a plurality of parallel cache banks, which enable L2 cache 810 to integrate fragment boundary checking into its hit/miss determination logic, as described in more detail below. Fragment checking logic included in TLB 804 enables TLB 804 to achieve an enhanced hit rate for memory requests to the same fragment. In a similar manner, organizing L2 cache 810 into the plurality of parallel cache banks reduces the number of expansive L2 cache misses to the same fragment.

An example organizational structure of the plurality of parallel cache banks of L2 cache 810 is depicted in FIG. 10. As illustrated in FIG. 10, L2 cache 810 includes L2 logic 1050, a first cache bank 1010A, a second cache bank 1010B, a third cache bank 1010C, a fourth cache bank 1010D, a fifth cache bank 1010E, and a sixth cache bank 1010F. It is to be appreciated that the embodiment depicted in FIG. 10 is for illustrative purposes only, and not limitation. For example, although L2 cache 810 is depicted to include six parallel cache banks, L2 cache 810 may include greater than or fewer than six cache banks. The embodiment depicted in FIG. 10 is now described in more detail.

L2 logic 1050 is configured to distribute page table entries into the plurality of cache banks 1010 based on fragment size and alignment boundary. In this way, each cache bank of L2 cache 810 processes memory requests for fragments of a predetermined size and a predetermined alignment boundary. Based on the predetermined size and the predetermined alignment boundary, L2 cache 810 may be configured as a direct mapped cache, a fully associative cache, a set associative cache, or a combination thereof, as would be apparent to a person skilled in the relevant art(s) from reading the description contained herein.

In an embodiment, L2 cache 810 comprises a direct mapped cache. In this embodiment, each cache bank of plurality of cache banks 1010 processes fragments on a particular alignment boundary and less than or equal to a predetermined fragment size.

For example, first cache bank 1010A is configured to process fragments of size zero (i.e., fragments including one page) on odd page address boundaries ending in 1'b1; second cache bank 1010B is configured to process fragments up to and including size one (i.e., fragments including one or two pages) on even page address boundaries ending in 2'b10; third cache bank 1010B is configured to process fragments up to and including size two (i.e., fragments including one, two, or four pages) on page address boundaries ending in 3'b100; fourth cache bank 1010D is configured to process fragments up to and including size three (i.e., fragments including one, two, four, or eight pages) on page address boundaries ending in 4'b1000; fifth cache bank 1010E is configured to process fragments up to and including size four (i.e., fragments including one, two, four, eight, and sixteen pages) on page address boundaries ending in 5'b10000; and sixth cache bank 1010F is configured to process fragments of any size, but on an alignment boundary ending in 5'b00000. Sixth cache bank 1010F is a catch-all bank configured to store fragments not stored in first cache bank 1010A, second cache bank 1010B, third cache bank 1010C, fourth cache bank 1010D, or fifth cache bank 1010E.

An overview of the operation of the direct mapped cache embodiment of L2 cache 810 is now described. In operation, L2 cache 810 receives a memory access request corresponding to a virtual memory address that missed in TLB 804. The memory access request is issued in parallel to each cache bank 1010. Due to the organizational structure of L2 cache 810, at most one of cache banks 1010 will have a hit (i.e., at most one of cache banks 1010 will include a page table entry that maps the virtual memory address to a physical memory address). If one bank in the plurality of cache banks 1010 has a hit, that bank will return the requested data to TLB 804 as described above. If all banks miss, then the overall memory request is a miss and the requested data is retrieved from the page table located off-chip as described above.

In an embodiment, plurality of cache banks 1010 are sized according to the specifications in Table 1.

TABLE 1

| Cache Bank | # of cache lines | # of PTEs per cache line |
| --- | --- | --- |
| First cache bank 1010a | 512 | 2 |
| Second cache bank 1010b | 256 | 2 |
| Third cache bank 1010c | 128 | 2 |
| Fourth cache bank 1010d | 128 | 2 |
| Fifth cache bank 1010e | 128 | 2 |
| Sixth cache bank 1010f | 256 | 2 |

In an alternative embodiment, plurality of cache banks 1010 may be different sizes. In this alternative embodiment, plurality of cache banks 1010 may be sized statistically at compile time, or may be dynamically sized based on resource management predictions. The size of each cache bank in plurality of cache banks 1010 may be determined based on fragment/alignment utilization. For example, plurality of cache banks 1010 may be sized to cover more even alignment boundaries than odd alignment boundaries.

In addition, each L2 cache 810 may also act as a non-faulting L3 cache for the other page table unit's L2 cache. This means that, in the case of an L3 miss, it will not attempt to fill the request via its interface to the memory controller.

A more detailed description of the operation of L2 caches 810 is now described. If page table mode is not enabled, L2 caches 810 will have no work to do, as no requests will reach them from TLBs 804. Otherwise, an L2 cache 810 logic processes requests from one TLB 804 per cycle. Each request includes the twenty most significant bits (MSBs) of the page request, 3-bit page table context and a 4-bit request ID. Assuming a flat page table model and given the page address, page table select bit, and page table registers, L2 cache 810 logic computes the physical memory address of the cache line containing the desired PTE. It first checks to see if the cache line is already in L2 cache 810. If the desired cache line is present, fault processing and detection takes place in L2 cache 810 before returning the associated PTE data back to the requesting TLB 804 client. The entire PTE is not returned in its original form, instead it is separated into 28-bit physical page address, 5-bit fragment field, one system bit, one cache snooping bit, and one fault bit. The requesting index is returned to TLB 804 client along with the distilled PTE data.

In an embodiment, if the cache line is not present, L2 cache 810 makes a request to the other L2 cache 810 in the other page table unit as an L3 request using the 27-bit cache line address. In this case, the result (hit or miss) comes back in a fixed number of cycles along with 256 bits of cache line data. If there is an L3 hit, the cache line data will replace an already existing cache line and request processing continues as before.

If the L3 misses, then L2 cache 810 logic issues a memory controller read request via its own memory controller interface. This request looks like a memory read request from any other memory read client. As the read request may entail significant latency, L2 cache 810 logic has its own latency compensation queue for storing read request data while waiting for the read data to return. An 8-bit index describing the queue store location is submitted along with the read request for later identification. Once the data returns, it replaces an already existing cache line and request processing continues as before.

In a flat page table model, the entire page table is laid out linearly in memory. Given a page table base address in physical memory, and a starting mapping address and ending mapping address in logical memory, the page table unit 810 computes the physical address corresponding to a logical PTE. The page table base address may be on 4 Kb (4,096 byte) boundary, but the starting and ending mapping addresses may be on 2 Mb (2,097,152) boundaries and specify an inclusive range. All mappings are considered invalid if the upper eleven bits of the last mapping address is arithmetically less than those of the first mapping address. The PTE address can be expressed as shown in Equation 5.

PTE address={BASE_ADDR[31:12], 12'b0}+
({LOG_ADDR[31:12],12'b0}−{START_ADDR
[31:21], 21'b0}) >>9   Equation 5

In general, the flow of control in response to a TLB 804 request follows this sequence in a flat page table model:

Given context and page address plus page table description, compute address of PTE cache line in physical memory;

If cache line is already present in L2 Cache, then extract PTE, perform fault processing and return data to requesting L1 TLB (done);

Otherwise, pass cache line address to L3 Cache and check for hit/miss after fixed number of cycles;

If there is an L3 hit, retrieve L3 cache line data, store in L2, extract PTE, process faults and return to requesting L1 TLB (done);

Otherwise, save request data and issue read request for cache line to MC;

When MC read data returns, store the data in L2, extract PTE, process faults and return to requesting L1 TLB (done).

One embodiment of the coprocessor supports multi-level page tables. Any special processing associated with multi-level page tables is performed by L2 cache 810 logic. L2 cache 810 logic computes the address of the PDE from a page directory and goes through the same type of read request processing as for the L1 TLB request. Once the PDE is present in the L2 Cache, the L2 logic computes the cache line address of the PTE from the page table.

Although the embodiments shown include a cache hierarchy including L1, L2 and L3 caches, other embodiments feature cache hierarchies with additional levels, including L4 caches, L5 caches, and so on.

The multi-level page table model offers one or more levels of indirection in order to support more flexibility in the physical layout of the page table. Instead of a base address that points to a linearly contiguous page table in physical memory, this model has a pointer to a special page known as a page directory. This page directory contains 1024 page directory entries (PDEs), each of which points to a $2^{nd}$ level 4 k-byte page table. Each $2^{nd}$ level 4 k-byte page table contains 512 64-bit PTEs. FIG. 9 is an illustration of a format of a PDE 900 according to an embodiment.

The second level page tables may be allocated discontiguously, or may even be left out if a given range of addresses is not to be used.

The twenty most significant bits of the PDE 900 contain the physical base address of the second level page table. Unused entries are marked with a V(alid) bit of 0 meaning that all addresses within that corresponding range are invalid. References to pages in these invalid ranges cause PDE protection faults which can be handled as described with reference to the PTE above.

In an embodiment, there may be up to three memory request cycles when fulfilling requests from a multi-level page table. However, other numbers of memory request cycles may be used without deviating from the spirit and scope of the present invention. The multi-level page table case follows the general flow:

Given context and page address plus page table registers, compute address of PDE cache line in physical memory;

If cache line already present in L2 Cache, extract page table address from PDE and continue using flat page table flow (done);

Otherwise, pass cache line address to L3 Cache and check for hit/miss after fixed number of cycles;

If L3 hit, retrieve L3 cache line data, store in L2, extract page table address from PDE and continue using flat page table flow (done);

Otherwise, save request data and issue read request for cache line to MC;

When MC read data returns, store in L2, extract page table address from PDE and continue using flat page table flow (done).

Interfaces to the page table as described herein include a translate field and a context field. The translate field instructs the page table unit to perform logical to physical address translations using a context selected by the context field. If the translate signal is de-asserted, this instructs the page table unit to treat the provided address as physical if outside a provided aperture or, if inside the aperture, to look up the address in the special system context 0.

Each page table unit supports multiple page table contexts. Each client can be programmed such that values in the context field select from the available page table contexts. The value in the context field can be statically overridden via per-client register programmable bit fields.

Aspects of the invention described above may be implemented as functionality programmed into any of a variety of circuitry, including but not limited to programmable logic devices (PLDs), such as field programmable gate arrays (FPGAs), programmable array logic (PAL) devices, electrically programmable logic and memory devices and standard cell-based devices, as well as application specific integrated circuits (ASICs) and fully custom integrated circuits. Some other possibilities for implementing aspects of the invention include: microcontrollers with memory (such as electronically erasable programmable read only memory (EEPROM)), embedded microprocessors, firmware, software, etc. Furthermore, aspects of the invention may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

VI. Conclusion

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

What is claimed is:

1. A computer-based method for processing memory access requests, comprising:
    organizing page table entries of a page table into at least one fragment that maps logical memory to at least one of logical memory or physical memory, the at least one fragment having a fragment size and an alignment boundary; and
    accessing a subset of the page table entries stored in one of a plurality of cache banks to determine a mapping between a first logical memory address and at least one of a second logical memory address or a physical memory address, each cache bank configured to store at least one page table entry corresponding to a fragment of a predetermined set of fragment sizes and a predetermined alignment boundary.

2. The computer-based method of claim 1, further comprising:
    determining a size of each cache bank based on statistical information at compile time.

3. The computer-based method of claim 1, further comprising:
    dynamically determining a size of each cache bank based on a resource management prediction.

4. The computer-based method of claim 1, wherein a first cache bank in the plurality of cache banks is configured to store at least one page table entry corresponding to a fragment having a fragment size of zero.

5. The computer-based method of claim 4, wherein a second cache bank in the plurality of cache banks is configured to store at least one page table entry corresponding to a fragment having a fragment size of at least one of zero and one.

6. The computer-based method of claim 5, wherein an Nth cache bank in the plurality of cache banks is configured to store at least one page table entry corresponding to a fragment having a fragment size that is a non-negative integer less than or equal to N−1, and wherein N is a non-negative integer greater than two.

7. A processor configured to process memory access requests, wherein page table entries of a page table are organized into at least one fragment that maps logical memory to at least one of logical memory or physical memory, the at least one fragment having a fragment size and an alignment boundary, the processor comprising:
    a client interface configured to receive a request for memory access;
    a translation lookaside buffer (TLB) coupled to the client interface and configured to store a first subset of the page table entries;
    a cache coupled to the TLB and configured to store a second subset of the page table entries, the cache including a plurality of banks, wherein each bank is configured to store a page table entry corresponding to a fragment of a predetermined set of fragment sizes and a predetermined alignment boundary; and
    a memory controller coupled to the client interface, the TLB, and the cache and configured to service the request for memory access from at least one of the TLB and the cache.

8. The processor of claim 7, wherein a size of each bank of the cache is determined at compile time based on statistical information.

9. The processor of claim 7, wherein a size of each bank of the cache is dynamically determined based on a resource management prediction.

10. The processor of claim 7, wherein a first bank of the cache is configured to store at least one page table entry corresponding to a fragment having a fragment size of zero.

11. The processor of claim 10, wherein a second bank of the cache is configured to store at least one page table entry corresponding to a fragment having a fragment size of at least one of zero and one.

12. The processor of claim 11, wherein an Nth bank of the cache is configured to store at least one page table entry corresponding to a fragment having a fragment size that is a non-negative integer less than or equal to N−1, and wherein N is a non-negative integer greater than two.

13. A computer readable medium containing instructions for generating a processor which when executed are adapted to create the processor, wherein page table entries of a page table are organized into at least one fragment that maps logical memory to at least one of logical memory or physical memory, the at least one fragment having a fragment size and an alignment boundary, the processor comprising:
    a client interface configured to receive a request for memory access;
    a translation lookaside buffer (TLB) coupled to the client interface and configured to store a first subset of the page table entries;
    a cache coupled to the TLB and configured to store a second subset of the page table entries, the cache including a plurality of banks, wherein each bank is configured to store a page table entry corresponding to a fragment of a predetermined set of fragment sizes and a predetermined alignment boundary; and
    a memory controller coupled to the client interface, the TLB, and the cache and configured to service the request for memory access from at least one of the TLB and the cache.

14. The computer-readable medium of claim 13, wherein the processor is embodied in hardware description language software.

15. The computer readable medium of claim 14, wherein the processor is embodied in one of Verilog hardware description language software and VHDL hardware description language software.

16. The computer-readable medium of claim 13, wherein a size of each bank of the cache is determined at compile time based on statistical information.

17. The computer-readable medium of claim 13, wherein a size of each bank of the cache is dynamically determined based on a resource management prediction.

18. The computer-readable medium of claim 13, wherein a first bank of the cache is configured to store at least one page table entry corresponding to a fragment having a fragment size of zero.

19. The computer readable medium of claim 18, wherein a second bank of the cache is configured to store at least one page table entry corresponding to a fragment having a fragment size of at least one of zero and one.

20. The computer readable medium of claim 19, wherein an Nth bank of the cache is configured to store at least one page table entry corresponding to a fragment having a fragment size that is a non-negative integer less than or equal to N−1, and wherein N is a non-negative integer greater than two.

* * * * *